United States Patent Office 3,780,167
Patented Dec. 18, 1973

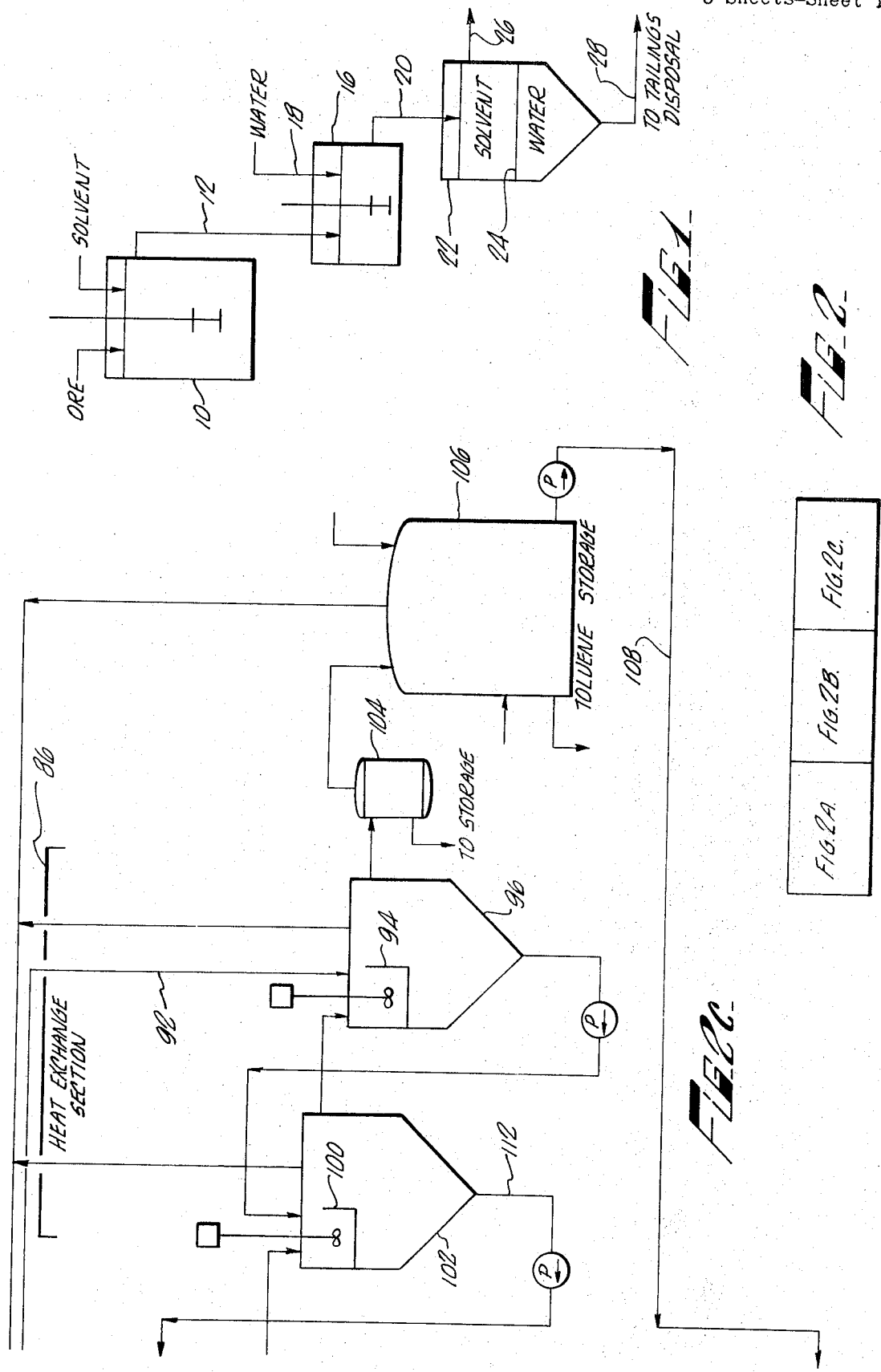

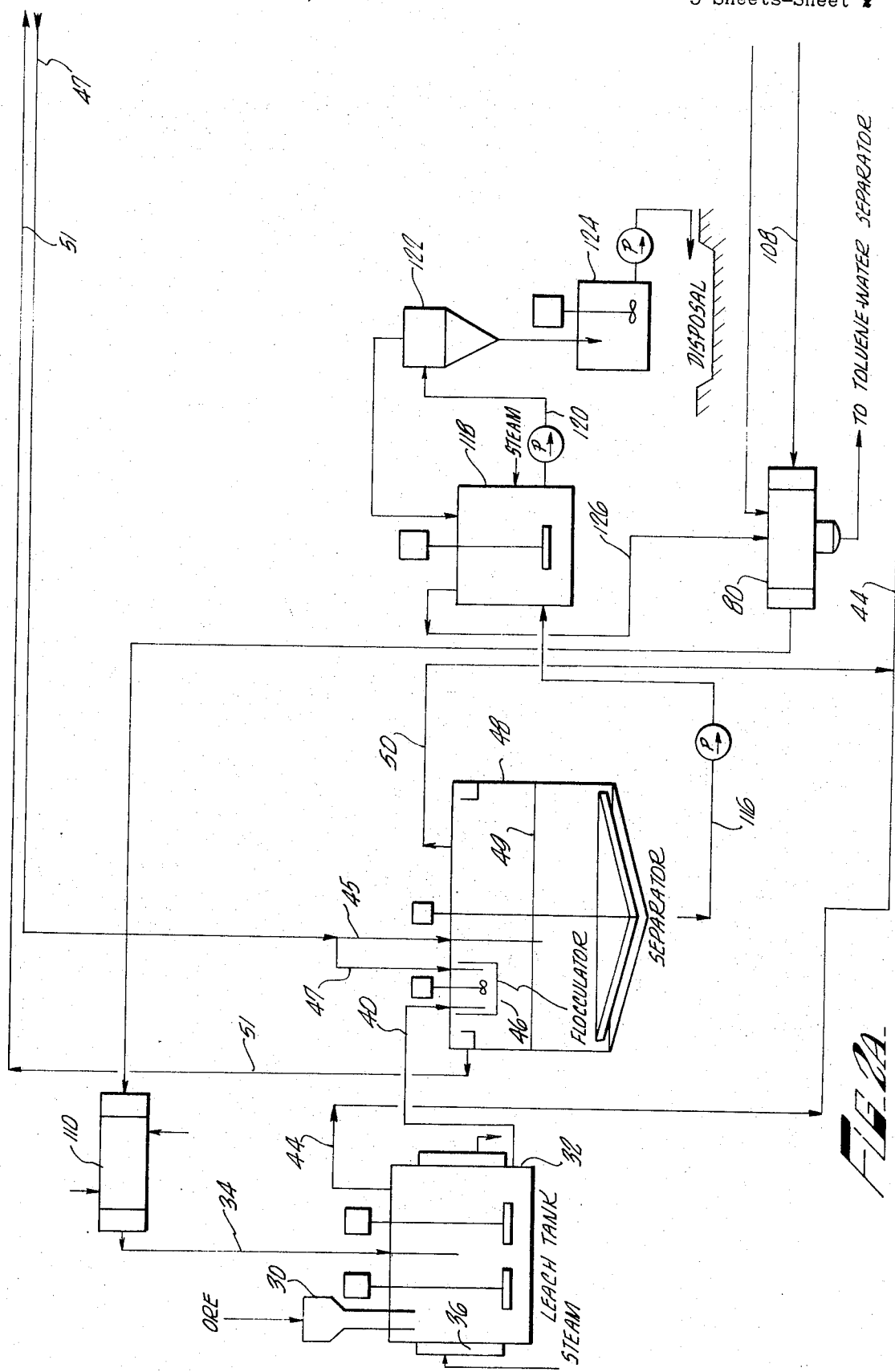

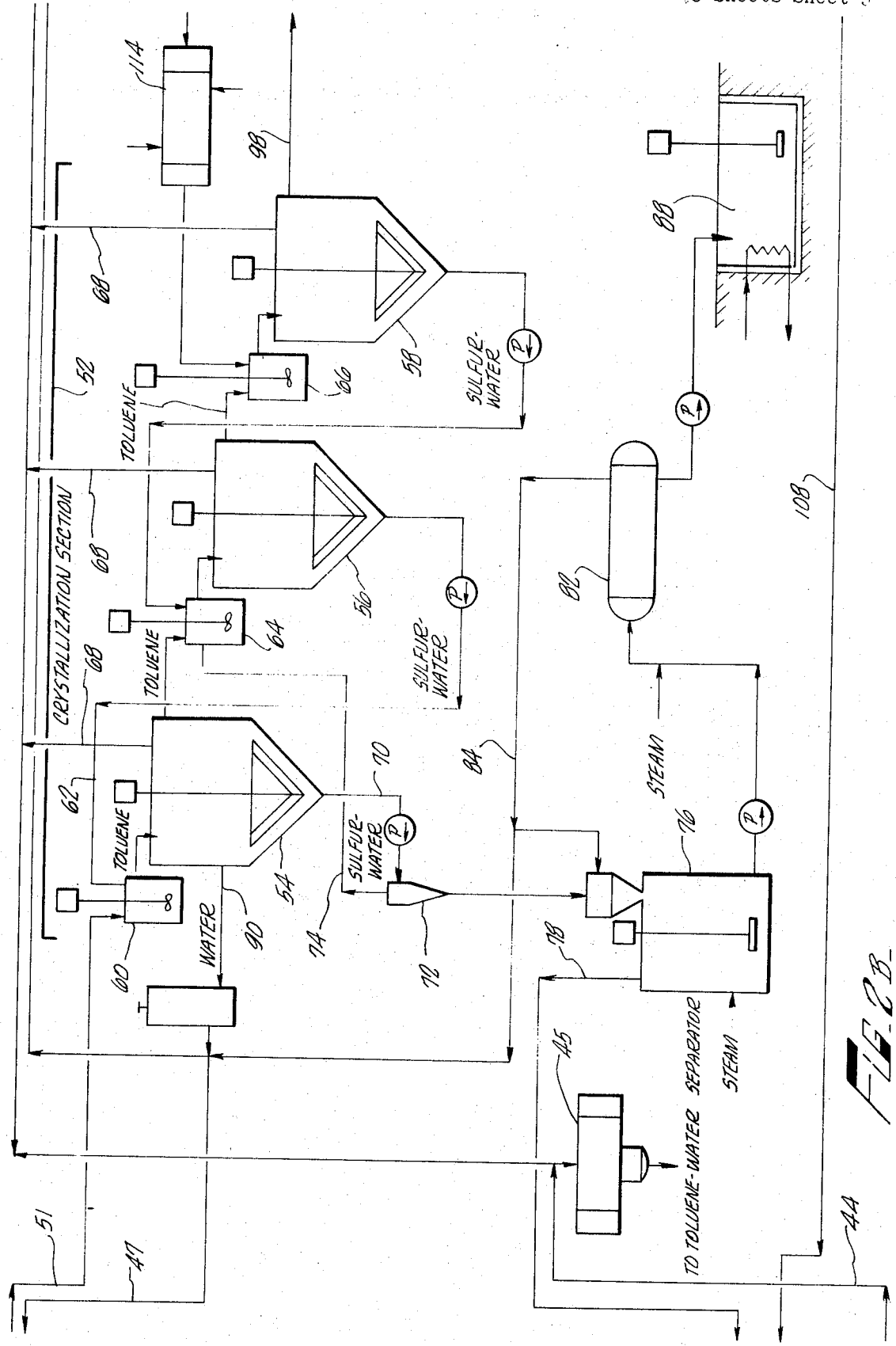

3,780,167
PROCESS FOR SOLVENT EXTRACTION OF ORES
Henry H. Wheeler, Jr., Newport Beach, Calif., assignor to William M. Lansdale and Francis E. Wingate, fractional part interest to each
Continuation of abandoned application Ser. No. 738,930, June 21, 1968. This application July 30, 1971, Ser. No. 167,780
Int. Cl. C01b *17/08*
U.S. Cl. 423—578                      12 Claims

ABSTRACT OF THE DISCLOSURE

A continuous process for extraction of valuable minerals from a mineral-bearing ore by a water-immiscible solvent which has a density less than that of water and in which the mineral is soluble. Following solvent extraction of the mineral from the ore, water is added to the ore-solvent mixture to flocculate residual gangue and separate the gangue from the mineral-rich solvent prior to treatment of the latter for separation of the mineral from the solvent.

This application is a continuation of application Ser. No. 738,930, filed June 21, 1968 and now abandoned.

BACKGROUND OF THE INVENTION

Solvent extraction processes to remove valuable minerals from ores have been known for many years. In essence, such processes require leaching of the ore with a solvent in which the mineral is soluble, separation of the mineral-rich solvent (fat liquor) from the leached ore, and treatment of the fat liquor to separate the mineral from the solvent so that a product is obtained and the solvent is recovered for reuse to extract additional mineral from fresh feed ore. The recovery of solvent is achieved by various methods, frequently by evaporation and condensation.

A problem in solvent extraction of ores is the separation of gangue, that is, the vein matter from which mineral has been removed, from the fat liquor. The finer particles resulting from crushing of the ore prior to solvent leaching are particularly troublesome in this respect. Inadequate separation of gangue from the fat liquor can result in adverse effects upon the product quality and yield, and upon the economies of the process.

SUMMARY OF THE INVENTION

The present invention is a process for solvent extraction of a mineral from a mineral-bearing ore. The process includes the step of contacting the ore with a water-immiscible solvent, which has a density less than that of water and in which the mineral is soluble, to leach a mineral from the ore. Water is then added to the mixture in an amount sufficient to hydrate the surfaces of residual gangue and to flocculate the hydrated gangue. The hydrated gangue is then separated from the mineral-rich solvent. The latter, from which substantially all gangue, including finer particles, is removed by reason of the water addition, is in condition for treatment to separate the mineral from the solvent, yielding thereby the product and regenerated solvent for recycling to the extraction unit.

The addition of water to the mineral-rich solvent in the quantities specified enables effective separation of residual gangue from the solvent and is particularly effective in enabling separation of finer particles from the solvent. The amount of water added is that required to hydrate the gangue and to provide an aqueous surface layer which exercises an attractive potential through hydrogen bonding upon adjacent similarly-hydrated gangue particles dispersed in the solvent. This attraction produces loosely-bonded floccules comprised of hydrated particles, the interstices of the floccules being filled with water. Upon passage of the mineral-rich solvent-particle mixture to a vessel having an interface between the lighter-than-water solvent and water, the floccules of hydrated particles, being heavier than the solvent and water, settle through the solvent to the solvent-water interface. The floccules are dispersed and substantially all of the gangue settles into the water phase. The balance, consisting of some finer particles, collects at the interface but does not reenter the solvent phase.

The purpose of the water addition to the mineral-rich solvent is to improve effective separation of gangue from the solvent. In the absence of water, the gangue particles will be solvent-wet and will remain suspended in the solvent phase. If such particles were to be removed by mechanical separation, as by filtration, large losses of solvent occur, with attendant increase in costs and reduced yield. By the present method, the particles passing into the water phase upon separation are essentially solvent-free. Water addition therefore isolates the gangue within the water phase and removes it from the solvent phase.

If too much water is added, the finer particles are held in very small floccules that in effect are slimes. These small floccules remain suspended in the solvent and do not separate from the solvent. On the other hand, the larger particles, which are not held in floccules, settle too rapidly through the solvent phase and produce a splashback upon striking a water-solvent interface. This can create tight solvent-water emulsions at the interface.

BRIEF DESCRIPTION OF DRAWINGS

The process of the present invention will be more completely understood from the following description made in conjunction with the accompanying drawings, in which:

FIG. 1 is a schematic representation of an extractive process according to the present invention; and FIGS. 2A, 2B, and 2C constitute a flow sheet showing an embodiment of the invention in an extractive process for removal of sulfur from ores.

DESCRIPTION OF THE PREFERRED EMBODIMENT

With reference to FIG. 1, a crushed ore is contacted with a water-immiscible solvent capable of extracting a mineral from the ore in a leach tank 10. To improve leaching of the mineral from the ore, the solvent is either heated prior to introduction into the tank or the mixture is heated with jacketed steam in the leach tank. The mixture is agitated in the leach tank and a mixture of residual gangue and mineral-rich solvent is continuously removed from the tank through a line 12 and passed into a flocculator 16. Water is added to the flocculator through a line 18 in an amount sufficient to hydrate the residual gangue and flocculate the hydrated gangue. In order to avoid excessive cooling of the mineral-rich solvent and attendant mineral crystallization, the water added to the flocculator is preferably heated. The mixture is vigorously agitated in the flocculator to disperse the added water throughout the solvent phase so that the gangue is contacted and hydrated by the water, and gangue floccules are formed.

The solvent-floccule mixture is passed by a line 20 to a separator 22 in which an interface 24 between solvent and water which has been added to the separator is formed. Although other inertial separating methods, such as centrifuging, may be used, gravitational separation is typically employed so that the process is described herein with reference to this means of separation. The floccules settle through the lighter solvent phase and contact interface 24 between the solvent and water. At the interface, the floccules are dispersed and the particles settle into the water phase or collect at the interface. The mineral-rich solvent is removed as an over-flow through a line 26 for further treatment to separate the mineral from the solvent. The gangue is removed as an under-flow from the bottom of the separator through a line 28 and either passes directly to tailings disposal or is intermediately treated to recover whatever small amount of solvent is retained by the gangue.

Although the process of the present invention as described may be used with appropriate solvents to extract a number of minerals from ores, it is particularly useful for the extraction of sulfur from ores. FIGS. 2A, 2B, and 2C constitute a flow sheet for a sulfur extraction process embodying the present invention. With particular reference to FIG. 2A, crushed ore is passed through a hopper 30 into a leach tank 32. Warm solvent which has been regenerated, as will be later described, is recycled into the leach tank through a line 34. Solvents which can be used for extraction of sulfur from ores include toluene, xylene, ethyl benzene, and benzene. Although the process of the invention is not so limited, its further description herein will be made with reference to the use of toluene as the solvent.

The ore and toluene are thoroughly agitated in the leach tank. Steam flowing through a jacket 36 raises the temperature of the mixture to approximately 180° F. The toluene dissolves sulfur from the ore leaving a residual gangue. A gangue-solvent mixture is continuously removed from the leach tank through a line 40. Toluene vapor is vented from the top of the leach tank through a line 44 and is passed to a vent vapor condenser 45 for condensation and subsequent recovery. Line 40 discharges the mixture into a flocculator 46 disposed in the upper portion of a larger vessel which acts as a separator 48.

Water is added to the flocculator through a line 47 in the amount for hydration and flocculation of gangue as already described. The amount of water required will vary to some extent with the particle size distribution of the gangue. However, for a typical mill run of ore, the amount of water added is between 2% to 6% by weight of the gangue in the sulfur-rich toluene. The total water in the flocculator is less than 10% by weight of the gangue. Excessive water addition can be readily detected by relatively simple tests. If too much water has been added, the toluene phase, for the reason already given, is turbid rather than clear after gravitational separation of toluene and water. Further, excessive water encapsulating gangue particles clings to a glass surface rather than being part of the water phase after separation.

Since by far the vast majority of naturally occurring ores are hydrophilic, the addition of water as described will result in hydration and flocculation. However, in those relatively rare instances in which the ore is wholly or in part hydrophobic, the addition of a suitable surfactant to the water prior to its passage into the flocculator enables practice of the invention as described. Various organic derivatives such as sodium salts of high molecular weight alkyl sulfates, or sulfonates, can be used.

The gangue-toluene-water mixture is vigorously agitated in flocculator 46 and the mixture continuously overflows into separator 48 where hydrated gangue floccules settle out of the solvent phase. Additional water is introduced through a line 45 into the separator below a toluene-water interface 49 to produce a pumpable or flowable slurry of gangue and water. In the separator there is a clear upper sulfur-rich toluene phase which, because of the addition of water, is substantially free of ore particles, and a lower water phase containing the gangue particles originally in the toluene phase.

Toluene vapor from the separator is vented through line 50 to line 44 for subsequent condensation and recovery. The clear sulfur-rich toluene is removed through a line 51 to a crystallization section 52. Although more crystallizer units can be used, three crystallizers 54, 56, 58 are shown in the drawing. In the crystallization section, the sulfur-rich toluene is progressively cooled by direct liquid-liquid contact with water. As a result of this cooling, sulfur crystals are crystallized from solution and enter the water phase to form an aqueous sulfur slurry.

The progressive cooling of the sulfur-rich toluene from separator 48 is achieved by passing it into a first mixing tank 60 where it is agitated in direct contact with cool water entering the tank through a line 62. The mixture is passed to crystallizer 54 where gravitational separation produces an upper toluene phase and a lower water phase. Cooling of the toluene crystallizes some of the dissolved sulfur, and the sulfur crystals settle into the water phase. Since the water in crystallizer 54 has already passed through crystallizers 56 and 58 in which crystallization of sulfur also takes place, as will be described, the water phase in crystallizer 54 contains the full yield of sulfur crystals.

Within the crystallization section, the toluene phase successively passes from crystallizer 54 through a second mixing tank 64, crystallizer 56, a third mixing tank 66, and crystallizer 58. Water, which initially contacts the toluene phase in mixing tank 66, then successively passes through crystallizer 58, mixing tank 64, crystallizer 56, and, as already described, mixing tank 60 and crystallizer 54. It will be seen that in serially passing from crystallizer 54 to crystallizer 58, the toluene phase is progressively cooled, whereas the counterflowing water phase is progressively heated. The solid-liquid-liquid direct heat exchange crystallizes the sulfur in the toluene phase so that the toluene leaving crystallizer 58 is substantially sulfur-free.

Toluene vapor from each of the crystallizers is removed through vapor vent lines 68 and passed to condenser 45 for condensation and subsequent recovery.

The sulfur crystal-water slurry from crystallizer 54 leaves the bottom of the crystallizer through a line 70 and passes into a cyclone 72 in which a major portion of the liquid is removed from the slurry to produce a concentrate of about 60% sulfur. The removed liquids are passed through a line 74 to mixing tank 64. The concentrated sulfur crystal-water slurry from the cyclone flows into a sulfur boil tank 76 where the mixture is heated by open steam to volatilize any remaining water and toluene. The water-toluene vapor passes by line 78 to the shell side of azeotropic condenser 80 where it is condensed and subsequently recovered in a toluene-water separator (not shown). The sulfur crystal-water mixture leaves the sulfur boil tank and enters a melter-decanter 82 where melted sulfur is separated from the remaining water. Water leaves the decanter through a line 84 manifolded so that the water can re-enter the system either in solvent-water heat exchange section 86, to be described, or in separator 48. The sulfur is passed from the decanter to a sulfur tank 88 for storage as the product.

To achieve a heat exchange balance which minimizes the cooling and heating requirements for the overall system, cooled sulfur-lean toluene from crystallization section 52 is heated by direct liquid-liquid heat exchange with water from crystallizer 54 and/or with water from melter-decanter 82. The water leaving crystallizer 54 through a line 90 has been heated by direct contact with toluene in the crystallization section and the water from the melter-decanter has been heated in the sulfur boil tank 76 prior to entry into the decanter.

The water from these two sources is introduced through a line 92 into a mixing tank 94 within a vessel 96. The cool toluene is introduced through a line 98 into a mixing tank 100 within a vessel 102. The flow of water and toluene is countercurrent within the heat exchange section. As to the toluene, it is mixed with water in tank 100. The mixture overflows into vessel 102 where gravitational separation occurs. The separated toluene is then heated by direct contact with water in tank 94, separated from the water in vessel 96, and passed through a toluene-water separator 104 into a storage tank 106.

The toluene in tank 106 is recycled to leach tank 32 for sulfur extraction through a line 108. It is heated by indirect heat exchange with toluene-water vapors in azeotropic condenser 80 and further heated in a steam preheater 110 prior to being passed into the leach tank.

The water which is cooled by heat exchange with the toluene in the heat exchange section leaves the section by a line 112 and is further cooled by indirect heat exchanger with water in a heat exchanger 114 before it enters the crystallization section.

The gangue-water slurry is removed from separator 48 through a line 116 and passed into a trailings stripper 118. Steam is added to heat the mixture and volatilize any toluene retained by the tailings. After heating and agitation, the stripped tailings are pumped through a line 120 to a cyclone 122, from which the tailings are passed into a sump tank 124 and water is returned to the tailings stripper. Water and toluene vapor from the tailings stripper are passed through a line 126 to azeotropic condenser 80 for indirect heat exchange with toluene being recycled to the leach tank. The condensates are separated in a toluene-water separator (not shown) and recovered.

Through use of surfaces whose wettability is selected according to the function performed by different steps of the process, the overall performance can be further improved. For example, the flocculator is preferably lined with a material providing a hydrophobic surface so that the solvent functions as a lubricant preventing sticking of the hydrated floccules to the flocculator surface. On the other hand, the crystallizers are preferably lined with a material providing a hydrophilic surface so that water functions as a lubricant preventing sticking of sulfur crystals to the crystallizer surfaces.

By the process as described for removal of sulfur from ore, a solvent-to-sulfur ratio as low as 12 to 1 can be employed. There is no requirement to melt sulfur to drive off solvent since the sulfur is carried in the water phase following crystallization. The direct heat exchange between the sulfur-rich toluene and water in the crystallizing section produces a high yield of sulfur because of the effective heat transfer which results. Further, the use of a lighter-than-water solvent in combination with controlled water addition effectively removes fine particles from the product stream with minimal solvent loss.

What is claimed is:

1. Process for solvent extraction of a mineral from a mineral-bearing ore which comprises:
    (a) contacting the mineral bearing ore with a water immiscible solvent having a density less than that of water and in which the mineral is soluble to leach the mineral from the ore to form a mineral-rich solvent-gangue mixture and without separating the mineral-rich solvent from the gangue;
    (b) adding, with agitation, to the mineral-rich solvent gangue mixture an amount of water sufficient to hydrate the surfaces of residual gangue to form loosely bonded floccules comprised of hydrated gangue particles but insufficient to form a slime of small gangue particles;
    (c) forming a mineral-rich solvent phase and a water-gangue phase containing the floccules of hydrated gangue particles; and
    (d) separating the mineral-rich solvent phase from the water-gangue phase.

2. Process in accordance with claim 1 wherein the mineral is sulfur.

3. A process for solvent extraction of sulfur from a sulfur bearing ore which comprises:
    (a) contacting the sulfur bearing ore with a heated water-immiscible sulfur solvent which has a density less than that of water to leach sulfur from the ore and form a sulfur-rich solvent-gangue mixture and without separating the sulfur-rich solvent from the gangue;
    (b) adding, with agitation, to the sulfur-rich solvent-gangue mixture an amount of water sufficient to hydrate the surface of residual gangue and to flocculate said hydrated gangue but insufficient to form a slime of finer gangue particles;
    (c) forming a sulfur-rich solvent phase and a water-gangue phase containing the floccules of hydrated gangue particles;
    (d) separating the sulfur-rich solvent phase from the water-gangue phase; and
    (e) cooling the sulfur-rich solvent phase to crystallize sulfur.

4. Process in accordance with claim 3 wherein the separation of gangue from solvent is by inertial separation.

5. Process in accordance with claim 3 wherein cooling is by direct contact with cool water.

6. Process in accordance with claim 3 wherein the solvent is an aromatic solvent.

7. Process in accordance with claim 3 wherein the solvent is toluene.

8. Process in accordance with claim 3 wherein the amount of water added to hydrate and flocculate the gangue results in a total water content of less than 10% by weight of the gangue.

9. Process in accordance with claim 3 wherein a surface-active agent is included in the water added to hydrate the gangue.

10. A process for solvent extraction of sulfur from a sulfur-bearing ore which comprises the steps of:
    (a) contacting the sulfur-bearing ore with a heated water-immiscible sulfur solvent which has a density less than that of water to leach sulfur from the ore and form a sulfur-rich solvent gangue mixture and without separating the sulfur-rich solvent from the gangue;
    (b) adding, with agitation, to the sufilfur-rich solvent-gangue mixture an amount of water sufficient to hydrate the surfaces of the residual gangue and to flocculate said gangue but insufficient to form a slime from the finer gangue particles;
    (c) forming a sulfur-rich solvent phase and a water-gangue phase containing the floccules of hydrated gangue particles;
    (d) separating the sulfur-rich solvent phase from the water-gangue phase;
    (e) cooling the sulfur-rich solvent phase by direct contact with water to crystallize sulfur and form a solvent phase and a slurry of crystallized sulfur;
    (f) separating the sulfur and residual water from the solvent phase;
    (g) heating the sulfur-lean solvent by direct contact with residual water and separating the solvent from the water; and
    (h) recycling the solvent for contact with sulfur-bearing ore.

11. Process in accordance with claim 10 wherein the step of adding water to hydrate the gangue comprises adding water to the gangue in a vessel having a hydrophobic surface.

12. Process in accordance with claim 10 wherein the step of cooling of the sulfur-rich solvent by direct contact with water comprises bringing the water in contact with the sulfur-rich solvent in a vessel having a hydrophilic surface.

References Cited

UNITED STATES PATENTS

| | | | |
|---|---|---|---|
| 3,512,943 | 5/1970 | Dubow | 23—224 X |
| 3,337,307 | 8/1967 | Kuster | 23—312 S |
| 2,890,941 | 6/1959 | Bartlett et al. | 23—312 S |

FOREIGN PATENTS

| | | | |
|---|---|---|---|
| 858,056 | 1/1961 | Great Britain | 23—312 S |

GEORGE O. PETERS, Primary Examiner

U.S. Cl. X.R.

23—299